(12) United States Patent
Werdecker et al.

(10) Patent No.: US 6,684,664 B2
(45) Date of Patent: Feb. 3, 2004

(54) PROCESS FOR MANUFACTURE OF A COMPONENT MADE OF OPAQUE SYNTHETIC QUARTZ GLASS

(75) Inventors: Waltraud Werdecker, Hanau (DE); Udo Gertig, Johannesberg (DE); Johann Leist, Altenstadt (DE); Helmut Leber, Hanau (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 205 days.

(21) Appl. No.: 09/839,795

(22) Filed: Apr. 20, 2001

(65) Prior Publication Data
US 2002/0134108 A1 Sep. 26, 2002

(30) Foreign Application Priority Data
Apr. 20, 2000 (DE) .......................................... 100 19 693

(51) Int. Cl.$^7$ .............................................. C03B 19/09
(52) U.S. Cl. ............................. 65/17.6; 65/108; 65/110
(58) Field of Search ................................ 65/17.3, 17.6, 65/108, 425, 417, 418, 279, 280, 283, DIG. 9, 110

(56) References Cited

U.S. PATENT DOCUMENTS 3,802,858 A * 4/1974 Minegishi
4,010,022 A * 3/1977 Schul
6,380,110 B1 * 4/2002 Werdecker et al.

FOREIGN PATENT DOCUMENTS

EP 0816297 A1 1/1998

* cited by examiner

Primary Examiner—Sean Vincent
(74) Attorney, Agent, or Firm—Milde & Hoffberg LLP

(57) ABSTRACT

A process for manufacture of a component made of opaque synthetic quartz glass, and a quartz glass tube manufactured according to said process. The process comprises (i) providing a starting material in the form of granulated material of highly pure, synthetic $SiO_2$ comprising at least partially porous agglomerates of $SiO_2$ primary particles, the granulated material having a compacted bulk density of no less than 0.8 g/cm$^3$, (ii) filling the granulated material into a mold and converting it to an opaque quartz glass preform through a process of melting, and (iii) reshaping the preform in a heat reshaping process to obtain a component made of opaque quartz glass. A quartz glass tube is made of quartz glass consisting of a granulated material of synthetic $SiO_2$ with a lithium content of no more than 100 wt-ppb, and the wall thickness of said component being in the range of 0.5 mm to 15 mm.

17 Claims, 2 Drawing Sheets

PROCESS FOR MANUFACTURE OF A COMPONENT MADE OF OPAQUE SYNTHETIC QUARTZ GLASS

The present invention relates to a process for the manufacture of a component made of opaque synthetic quartz glass. Moreover, the invention relates to a quartz glass tube manufactured in accordance with said method.

BACKGROUND OF THE INVENTION

Quartz glass tubes, rods, panels, and blocks, either as semi-finished or finished goods, are important components for heat engineering applications, in which good thermal insulation along with high temperature stability and thermal fatigue resistance are essential. Applications of the semiconductor industry put ever increasing demands on the purity of the opaque quartz glass tubes and components used. Reactors, diffusion tubes, thermal shields, cones or flanges are but a few examples. These applications require the glass components to be opaque mainly in the infrared region of the spectrum. The impurities present in low-purity quartz glass contribute to the opacity of the glass. However, quartz glass manufactured from pure starting materials is transparent, and must be made opaque by artificially introducing pores into the glass.

In this context, the manufacture of thin-walled opaque quartz glass tubes or tube sections by reshaping an opaque blank in a thermal reshaping process poses a formidable problem because of the low wall thickness such tubes or tube sections have, which causes these parts to easily become transparent while heated in the reshaping process, especially if highly pure starting materials are used for manufacture. This invention relates to the manufacture of components, above all of thin-walled tubes, of opaque quartz glass manufactured from pure starting materials.

A manufacturing method for opaque quartz glass from pure starting materials is described in EP-A1 816 297, proposing to create opacity in the quartz glass by preparing a powder mixture consisting of synthetic $SiO_2$ particles with a mean particle size of 300 μm and an additive in the form of silicon nitride powder, and melting the mixture. Upon melting, thermal decomposition of the $Si_3N_4$ powder releases the gaseous components of the powder mixture, such as nitrogen. The gaseous components generate pores in the softened quartz glass, and provide for the desired opacity of the form body. The form body is manufactured by placing the powder mixture in a graphite mold lined with graphitic felt and heating in a vacuum at a temperature of 1,800° C. in an electrically heated furnace. Upon melting, the front of the softening and melting quartz glass migrates from the mold wall radially to the core producing the so-called "melting front".

Any contaminations present can cause de-vitrification of the quartz glass, resulting in brittleness and reduced thermal fatigue resistance. Residual additive can also negatively affect these quality properties of the quartz glass. An inhomogeneous pore distribution is also detrimental. Vitrification may be accompanied by a pore growth process, in which larger pores grow to the disadvantage of smaller ones. Large pores, however, contribute only little to opacity, cause the density of the opaque quartz glass to be low, and reduce the mechanical stability and the serviceable life of the quartz glass form body.

The manufacture of quartz glass tubes from such form bodies is both work- and time-intensive, especially if high dimensional accuracy is required. High dimensional accuracy of the wall thickness is a general prerequisite in all applications, in which another component is attached to a quartz glass tube by melting.

SUMMARY OF THE INVENTION

It is an object of the invention to provide a method for the inexpensive manufacture of components, above all thin-walled tubes or tube sections, made of opaque quartz glass and characterized by high chemical purity and high dimensional accuracy.

It is also an object of the invention to provide a quartz glass tube manufactured by said method, especially for use in the production of semi-conductors.

The manufacture of the desired opaque quartz glass components is by a process comprising the following steps:
(a) Providing a starting material in the form of a granulated material of highly pure synthetic $SiO_2$ comprised of at least partially porous agglomerates of $SiO_2$ primary particles, with a compacted bulk density of no less than 0.8 $g/cm^3$;
(b) Filling a mold with the granulate material and fabrication of an opaque quartz glass preform through a melting process;
(c) Reshaping the preform in a thermal reshaping process to form the opaque quartz glass component.

The process according to the invention entails at least two processing steps at high temperatures (hereinafter referred to as "heat treatment step" or "heat reshaping process"). In steps (b) and (c) of the process above, the starting material and the preform made from the starting material, respectively, are subjected to processing at high temperatures. The process according to the invention is characterized by the fact that an opaque component made of pure quartz glass is obtained after the heat treatment steps described above, even from highly pure starting materials. The second heat reshaping process offers a low-cost opportunity to adjust the final dimensions of the opaque component to the desired values at high dimensional accuracy. This relates mainly to the wall thickness, inner and outer diameters of tube-shaped components, and the outer diameter of rod-shaped components.

It is an essential prerequisite of the process according to the invention to use in process step (a) above a starting material in the form of a granulated material made from highly pure synthetic $SiO_2$. In a suitable highly pure $SiO_2$ starting material for the purpose of the present invention the total content of contaminants, such as Li, Na, K, Mg, Ca, Fe, Cu, Cr, Mn, Ti, and Zr, is below 1 weight-ppm. In this context, doping agents are not considered contaminants.

The granulated material consists of at least partially porous agglomerates of $SiO_2$ primary particles and has a compacted bulk density of no less than 0.8 $g/cm^3$. Primary particles of this type can be fabricated by flame hydrolysis or oxidation of silicon compounds, hydrolysis of organic silicon compounds in accordance with the so-called sol-gel process or hydrolysis of inorganic silicon compounds in a liquid medium. Although primary particles fabricated by one of these methods are characterized by high purity, they are difficult to handle due to their low bulk density. Thus, it is common to compact this material by means of granulation procedures. Granulation causes the fine primary particles to form agglomerates of larger diameter. For the success of the process according to the invention it is essential that gases are trapped in the material when the granulated material is melted, which requires that there is a certain degree of porosity, which can be conferred either by open or closed pore spaces inside the individual agglomerates. In the preform melting process, the majority of the existing pore spaces close during the sintering and collapsing steps. However, previously open pore channels are converted into a multitude of fine closed pores capable of back-scattering IR radiation and, thus, conveying high IR opacity also. The required opacity can also be introduced into the quartz glass by using a granulated material consisting of agglomerates with a rugged surface structure showing superficial fissures. In the melting process, these fissures form a pore space that can entrap gases and, thus, form closed pores in the preform. These fine, closed pores scatter incident light which renders the preform opaque.

As a consequence, it is not necessary to add an additive that becomes volatile during vitrification in order to generate opacity—such as is done in the known process described above—and consequently there is no risk of introducing contaminants into the quartz glass with an additive.

At a compacted bulk density of no less than 0.8 g/cm$^3$, the $SiO_2$ granulated material can be placed in the mold to produce a preform; the compacted bulk density is a measure of the porosity of the granulated material and can be determined in accordance with DIN ISO 787 part 11.

The invention is illustrated in the following on the basis of embodiments and the drawings. The drawings show in diagrammatic view:

DESCRIPTION OF THE PREFERRED EMBODIMENTS

Further details on the manufacture as well as the chemical and physical properties of a granulated material suitable for the purposes of the process according to the invention are given below.

Figure 1:
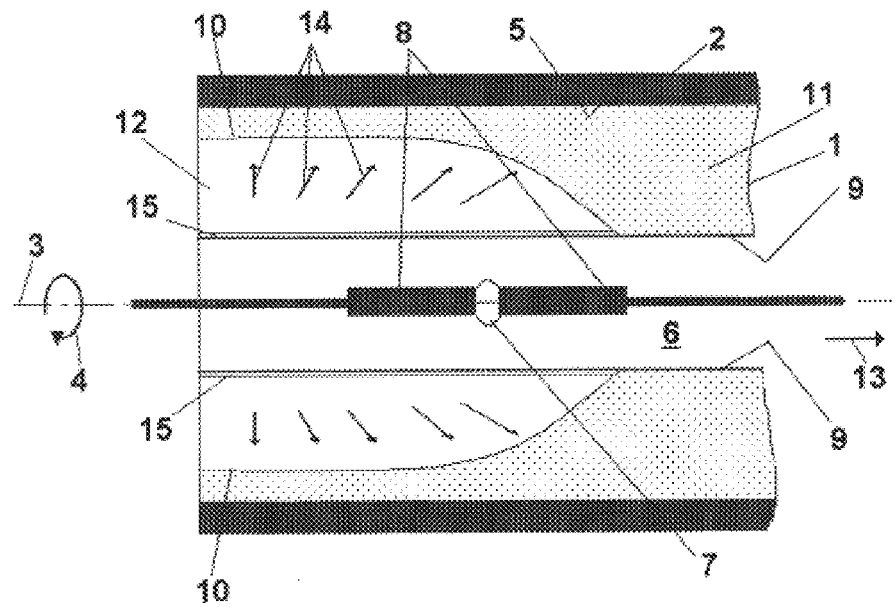
FIG. 1 the process step of vitrification (melting) of granulated material by means of an arc under formation of a hollow cylinder, FIG. 2 the manufacture of a quartz glass tube by extending and top blowing a quartz glass cylinder in a horizontal drawing process, FIG. 3 a first embodiment of the $SiO_2$ granulates according to the invention, shown as a cross section through an individual $SiO_2$ grain, FIG. 4 a second embodiment of the $SiO_2$ granulates according to the invention in the form of spray-granulated material, shown as a cross section through an individual spray grain, FIG. 5 a third embodiment of the $SiO_2$ granulates according to the invention in the form of an extrudate shown as a three-dimensional view, and in FIG. 6 a cross section of another embodiment of the $SiO_2$ granulates according to the invention in the form of an extrudate.

FIG. 1 shows a schematic depiction of the process according to the invention for manufacture of a hollow cylinder 12 from opaque quartz glass by vitrification of the initially porous form body 1. The manufacture of form body 1 shall be described in detail in the following:

A wet granulation process is used to manufacture $SiO_2$ granulated material from synthetic $SiO_2$. The granulated material is treated with a $Cl_2$/HCl gas mixture for cleaning. The following contaminant contents are detected in the cleaned material (in units of wt-ppb): lithium <10; sodium 40; potassium 36; iron 30. The specific BET surface of the granulated material and the compacted bulk density of the material are adjusted to 34 m$^2$/g and 1.1 g/cm$^3$, respectively, by thermal compaction in a rotating tubular kiln at a temperature of 1,200° C.

The granulated material is then filled into tube-shaped metal mold 2 rotating around its longitudinal axis 3. The direction of rotation is indicated in FIG. 1 by direction arrow 4. Under the effect of the centrifugal force and by means of a template, the bulk material is shaped at internal wall 5 of metal mold 2 into a rotationally symmetrical form body 1. The bulk layer of form body 1 has a thickness of approx. 100 mm with an inner bore hole 5 in the form of a continuous bore hole 6 with an internal diameter of approx. 75 mm. The bulk material is mildly compacted by the applied centrifugal force prior to the subsequent steps of the process.

To manufacture opaque hollow cylinder 12, successive zones of mechanically pre-compacted form body 1 are melted in an arc progressing from inner bore 6 of form body 1 towards the outside. For this purpose, an electrode pair 8 is inserted into inner bore 6 commencing on one end of form body 1, and moved continually along inner wall 9 towards the opposite end of form body 1. The rate of feed of electrode pair 8 is set to 55 mm/min. At this relatively slow rate of feed the strongly thermally insulating bulk material (form body) becomes sufficiently heated throughout to allow a dense wall to be formed. The temperature of the arc, 7, is sufficiently high to vitrify form body 1. A maximal temperature in excess of 2,100° C. can be attained at the inner wall of form body 1. In the process, vitrification front 10 is created inside form body 1, and progresses from inside to outside towards metal mold 2. The vitrification zone corresponds to the phase boundary between open-pored area 11 of form body 1 and partially melted, opaque area 12 of form body 1. The direction of movement, 13, of vitrification front 10, which is essentially radial from inner wall 9 of inner bore 6 towards the outside, is schematically shown by direction arrows 14 in FIG. 1. The rate of feed of electrode pair 8 is superimposed over the movement of the vitrification zone. Gases trapped in the granulated $SiO_2$ cause pore formation in opaque area 12 and ensuing generation of opacity, as desired.

Because of the high temperature of arc 7, the area of inner wall 9 of inner bore 6 is strongly compacted in the course of this process. This creates an inner surface layer 15 of transparent or translucent quartz glass in hollow cylinder 12 that was fabricated from form body 1 through a melting process.

After removal from metal mold 2, any sand adhering to hollow cylinder 12 is removed and the outer surface carefully smoothed by mechanical polishing. In the embodiment shown, hollow cylinder 12 has dimensions of 190 mm outer diameter and 150 mm inner diameter. Hollow cylinder 12 provides the opaque quartz glass mass required in the subsequent drawing process. Quartz glass tubes with a large outer diameter—e.g. 350 mm—and sufficient wall thickness—e.g. 5–8 mm—can be fabricated from large, massive hollow cylinders. Quartz glass tubes of this type are mainly used as components in the production of semiconductor wafers with diameters of 300 mm.

In the following, it shall be explained how hollow cylinder 12 is processed to an opaque quartz glass tube by stretching and blowing.

Figure 2:
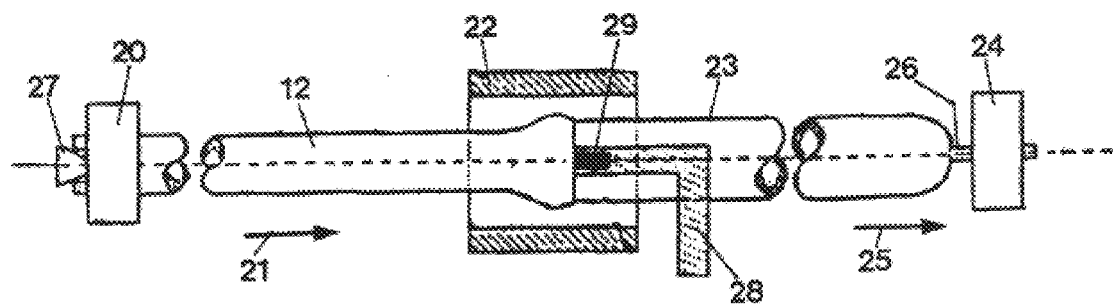

FIG. 2 shows a common facility for a horizontal drawing process. The quartz glass hollow cylinder, 12, fabricated in the step of the process described above, is made to rotate around its horizontally-oriented longitudinal axis and then continually advanced by a feeding facility 20 along the direction indicated by arrow 21 at a rate of 5 cm/min to enter an electric resistance furnace 22 arranged like a ring around hollow cylinder 12. At a temperature of approx. 2,100° C. the viscosity of the quartz glass is lowered sufficiently to allow hollow cylinder 12 to be drawn out into tube 23. This step is facilitated by a drawing facility 24 which draws out tube 23 in the direction of arrow 25 at a rate of 10 cm/min, while tube 23 rotates around its longitudinal axis. The free end of tube 23—with a diameter of 250 mm and a wall thickness of 5.5 mm—is melted in a gas-tight connection onto withdrawal rod 26 made of quartz glass, whereas the opposite free end of hollow cylinder 12 is sealed by gas-tight rotary transmission leadthrough 27. A shaping tool with two water-cooled form jaws 28 lined with graphite jaws 29 protrudes into the furnace. Tube 23 is then blown up against graphite jaws 29. To establish and maintain an internal overpressure in tube 23 and hollow cylinder 12, an oxygen flow is introduced into hollow cylinder 12 through rotary transmission leadthrough 27. The internal overpressure causes hollow cylinder 12, which is quite viscous at this point, to be blown against fixed graphite jaws 29 to attain the pre-set diameter of 250 mm at a wall thickness of 5.5 mm.

The thin-walled tube, 23, thus obtained consists of opaque synthetic quartz glass. The following contaminant levels are detected (in units of wt-ppb): lithium <10; sodium 60; potassium <50; iron 100. The transmission through the entire thickness of the wall is below 1% (relative to the initial radiation intensity) in the ultraviolet, visible, and infrared portions of the spectrum.

Figure 3:
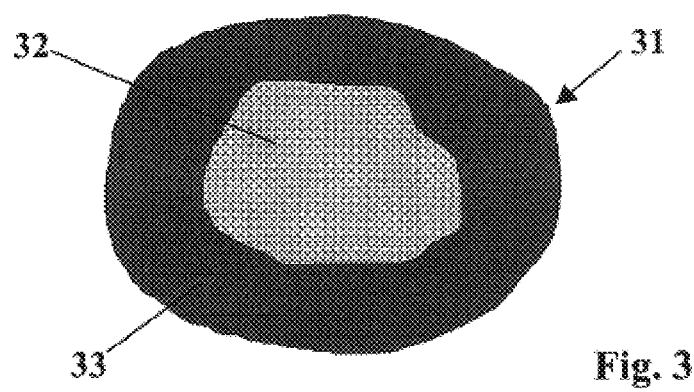

The $SiO_2$ granulated material used in the process described above is illustrated in the following FIG. 3. FIG. 3 shows a schematic depiction of a typical single grain 31 of the granulated material. The spherical granulated grain, 31, consists of porous quartz glass and has a central area 32 of lower density surrounded by an external area 33 of higher density. The densities of the central area and the external area are approx. 40% and 60% of the density of transparent quartz glass, respectively. The phase boundary between central area 32 and external area 33 is fluent. The grain diameter is 420 μm; the thickness of external layer 33 is approx. 100 μm.

A common wet granulation process with a mixing device is used in the manufacture of the granulated material. In the process, amorphous, nano-scale, pyrogenic $SiO_2$ particles produced by $SiCl_4$ flame hydrolysis with a specific surface (BET method) of 60 m²/g are made into an aqueous suspension and then successively dehydrated under stirring, until the material falls to pieces as a grainy mass. After drying, the specific surface (BET Method) of the granulated material is 50 m²/g, and the diameter of the spherical granulate grains thus produced is in the range of 160 μm to 1,000 μm. Subsequently, the $SiO_2$ granulated material is passed through a zone that heated to a temperature of approx. 1,200° C., contains a chlorine atmosphere, and effects both thermal pre-compaction and cleaning of the granulate. Cleaning by means of chlorine is particularly effective, because the presence of pore channels renders the surface of the $SiO_2$ particles accessible to the cleaning gas and makes the gaseous contaminants easy to remove. The throughput at this point is 10 kg/h. In the course of this step, a temperature gradient becomes established in the individual granulate grains, which causes central area 32 and external are 33 of different densities to form.

After this pre-treatment, the $SiO_2$ granulated material is characterized by having a specific BET surface of 34 m²/g at a compacted bulk density of 1.1 g/cm³. The mean grain diameter is approx. 420 μm. At this stage, it is especially important—though not required in this particular case due to the conditions of manufacturing—to remove the fraction of fine particles with a diameter below 100 μm before supplying the material to the opaque quartz glass-making process. The total content of contaminants such as Li, Na, K, Mg, Ca, Fe, Cu, Cr, Mn, Ti, and Zr is below 200 wt-ppb.

This granulated material consisting of amorphous, nano-scale $SiO_2$ particles can then be used to manufacture opaque quartz glass, as described by example of FIGS. 1 and 2. Since the individual granulate grains are formed by agglomeration of a large number of very small primary particles, the process of vitrification affords an accordingly fine and homogeneous pore distribution, as has been described in detail above.

Figure 4:
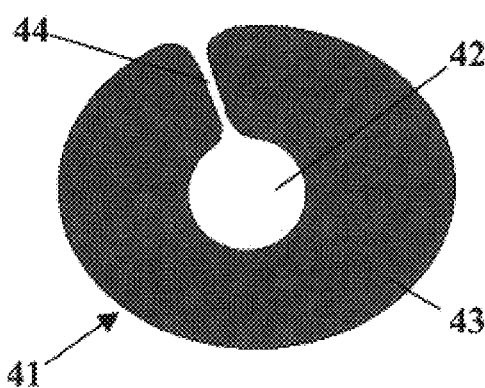

FIG. 4 schematically depicts an individual spray grain 41. This grain is typical for a spray granulated material suitable for use in the process described by example of FIGS. 1 and 2 above. Typical spray grain 41 is an agglomerate of $SiO_2$ primary particles, and consists of hollow space 42 surrounded by outer layer 43. Outer layer 43 contains a funnel-like structure connecting hollow space 42 with the outside through a narrow channel 44. The outer diameter of spray grain 41 is approx. 300 μm; the thickness of outer layer 43 is approx. 100 μm.

The production of the spray granulated material shall be described in the following:

Highly pure, nano-scale, pyrogenic $SiO_2$ primary particles with a specific surface (BET method) of 60 m²/g are dispersed in deionized water. Then, 12 wt-ppm aluminum are added in the form of pyrogenic $Al_2O_3$. The suspension is adjusted to a density of 1,380 g/l, while the slip viscosity is 450 mPas. Using a commercial spray dryer (Dorst, Type D400), the suspension is sprayed at an air temperature of 380° C. and a slip pressure of 10.5 bar to produce spray-granulated material with a mean grain diameter of 330 μm and 0.3% residual moisture content. The specific surface (BET method) of the spray-granulated material is 54 m²/g at a bulk density of 0.6 g/cm³. Subsequently, the granulated material is cleaned and thermally compacted by passing through a $HCl/Cl_2$ gas atmosphere at 1,200° C. at a throughput of 6.1 kg/h.

After this treatment, the specific surface of the material is 20 m²/g at a bulk density of 0.8 g/cm³ and a compacted bulk density of 0.92 g/cm³. Under these particular production conditions, the fine grain fraction with a grain diameter below 100 μm has already been separated off during spray granulation by means of a cyclone. The total content of contaminants such as Li, Na, K, Mg, Ca, Fe, Cu, Cr, Mn, Ti, and Zr is below 500 wt-ppb.

This spray-granulated material consisting of amorphous, nano-scale $SiO_2$ particles can be used in the manufacture of opaque quartz glass by the process described by example of FIGS. 1 and 2. Since the individual spray-granulated grains are formed by agglomeration of a large number of very small primary particles, the process of vitrification affords an accordingly fine and homogeneous pore distribution. Even more so, as hollow space 42 forms an additional nearly closed gas space that is at least partially conserved during vitrification, because the trapped gas is prevented from escaping during vitrification and thus contributes to pore formation and generation of quartz glass opacity.

Figure 5:
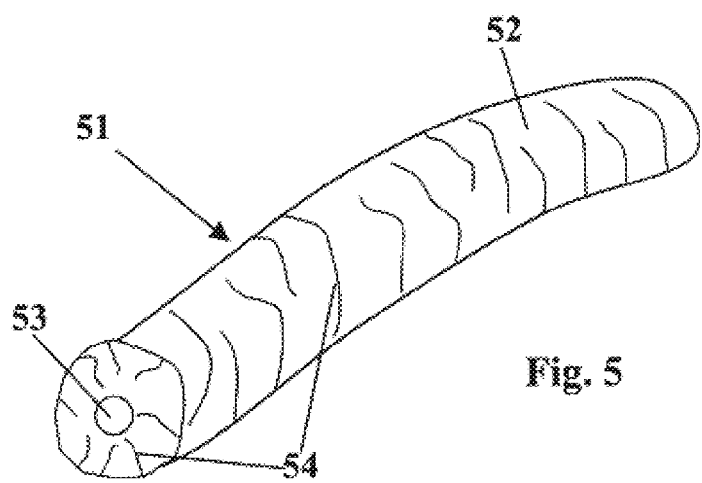

FIG. 5 shows a schematic depiction of a single grain 51 of a granulated material present in the form of an extrudate. An extrudate is also suitable for use in the process described above by example of FIGS. 1 and 2. Typical grain 51 also represents an agglomerate of $SiO_2$ primary particles. It possesses an elongated outer surface 52 surrounding pore channel 53. Outer surface 52 shows a fissured structure due to the presence of a multitude of deep grooves 54. The diameter of grain 51 is between 0.2 mm and 1 mm, the grain is several-fold as long as thick.

The extrudate is produced with a known extrusion process, in which a very viscous mass of highly pure, pyrogenic, nano-scale $SiO_2$ primary particles with a specific surface (BET method) of 400 $m^2/g$ and deionized water are placed in an extruder unit and pushed through a die, such as a screen. The individual holes of the die are usually designed to be bore holes with a spherical cross-section, though star-shaped or polygonal cross-sections are also suitable to produce an extrudate with a structured surface profile, as shown for extrudate 61 in FIG. 6. In this embodiment, the deeply fissured, structured surface profile, 62, of the individual granulate grains provides an essential contribution to the desired opacity of the quartz glass produced from this material through a melting process. Because of the presence of additional "gas traps" (inner pore channel 53, strongly structured surface 62) present in extrudates 51, 61 shown in the Figure, even the relatively low specific surface (BET method) of approx. 3 $m^2/g$ suffices to produce the desired porosity.

Subsequently, the porous extrudate is cleaned and sintered at 1,250° C., in the course of which the specific surface of the material adjusts to approx. 3 $m^2/g$ and the compacted bulk density to 0.95 $g/cm^3$. The total content of contaminants such as Li, Na, K, Mg, Ca, Fe, Cu, Cr, Mn, Ti, and Zr is below 400 wt-ppb.

Figure 6:
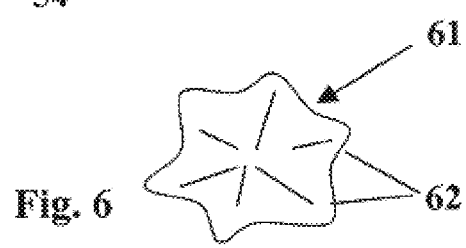

This extrudate consisting of amorphous, nano-scale $SiO_2$ particles in accordance with FIGS. 5 and 6 can be used in the manufacture of opaque quartz glass with the process described by example of FIGS. 1 and 2. Though the BET surface of this granulate is comparatively small, due to the surface of individual grains 51 being highly structured and containing grooves, the gas between the individual grains becomes trapped during vitrification of hollow cylinder 12, such that the desired opacity is attained. Even more so, as pore channel 53 forms an additional, nearly completely closed gas space which is at least partially conserved during the process of vitrification.

A preform made of opaque quartz glass is fabricated from the granulated material through a melting process. For this purpose, the granulated material is placed in a mold, in which it is heated and melted. While the granulated material can be added equally before and during the melting process, it is essential that a preform made of opaque synthetic quartz glass is obtained. The preform usually possesses the shape of a cylinder, but deviations from this shape, such as towards spherical or conical shape, are irrelevant for the technical success of the process of the invention. Before the preform melting process is complete, at least part of the preform is present as a layer of granulated material or bulk granulated material. For reasons of simplicity, this intermediate state shall also be called "preform".

After any processing steps, such as cleaning or smoothing of the external surface of the preform, the preform is subjected to a heat reshaping process, in which the desired opaque quartz glass component is fabricated at high dimensional accuracy. The heat reshaping process may be conducted as a drawing process or by reshaping the softened preform by means of another form, tool or gravity forces. Components such as tubes, rods, blocks, and panels can be thus fabricated. The process of preform reshaping into the component can also be conducted in several procedural steps, it being essential only that the preform fabricated in a first heat treatment step is processed to an opaque quartz glass component in at least one additional heat treatment step, because the component attains its designated final dimensions no earlier than in the additional heat treatment step. As a result, the component can be fabricated to high dimensional accuracy of the final dimensions.

The process of the invention has proven especially suitable in the manufacture of opaque quartz glass components shaped like tubes or tube sections. For this purpose, the preform is removed from the mold and its external surface is then subjected to mechanical treatment before the preform is moved into a heating zone, in which it is softened starting at one end and progressing towards the other, upon which the preform is reshaped into an opaque quartz glass tube by stretching and top blowing. The process is especially suitable for the manufacture of thin-walled tubes with low wall thickness and strict diameter tolerances. The wall thickness of tubes and tube sections of this type ranges from 0.5 mm to 15 mm.

After the heat treatment step in which the preform is prepared from the granulated material through a melting process, the preform is subjected to at least one additional heat treatment step, in which it is softened, stretched, and top-blown into a (thin-walled) opaque quartz glass tube. One characteristic of this process is that despite the use of highly pure starting materials an opaque quartz glass tube can be obtained—which is especially important in the manufacture of thin-walled tubes—through the described heat treatment steps, and that the final dimensions of the opaque quartz glass tubes displaying high dimensional accuracy are attained no earlier than in the additional heat treatment step or steps.

An essential prerequisite for attainment of the characteristics described above is that a starting material is used in the manufacture of a preform which complies with step (a) of the process of the invention in that it consists of a granulated material of highly pure synthetic $SiO_2$, as has been explained above.

After removal of the preform from the mold, at least part of the external surface of the preform is subjected to mechanical treatment—e.g. the external cylinder surface of cylinder-shaped preforms—to free the external surface from any loosely adhering material, and then the surface is smoothed. To render the external surface as smooth as possible facilitates the production of a higher quality surface in the subsequent steps of the process.

After this treatment the preform is moved into a heating zone, in which it is softened starting from one end and progressing towards the other. In this process, the preform is reshaped by stretching and top blowing into a thin-walled tube consisting of opaque synthetic quartz glass. Stretching and top blowing can also be conducted in several procedural steps, it being essential only that a preform produced in a first heat reshaping process can be processed into an opaque quartz glass tube characterized by high dimensional accuracy through at least one subsequent heat reshaping process. The process according to the invention is the first to facilitate the low cost manufacture of high purity opaque quartz glass tubes from synthetic starting materials, with the products in the individual case having thin walls.

In the context of the invention, thin walled quartz glass tubes shall be defined as tubes with a wall thickness of approx. 15 mm or less. Thin walled opaque quartz glass tubes are used e.g. in the manufacture of components for the processing of highly pure semi-conductor materials.

Because of its pourability and good handling properties, starting material consisting of granulated material with a compacted bulk density in the range of 0.9 g/cm$^3$ to 1.4 g/cm$^3$ has proven especially suitable in this application and yields good results in terms of the opacity of the quartz glass—especially in the infrared part of the spectrum.

Similar to the compacted bulk density, the specific surface of the granulated material is a measure of the porosity of the granulated material or agglomerates. Especially suitable for the purpose of the process according to the invention has been a SiO$_2$ granulated material with a specific surface (according to the BET method) between 1 m$^2$/g and 40 m$^2$/g, preferably between 10 m$^2$/g and 30 m$^2$/g. The specific surface (BET method) of the granulated material is a result of the large pore space of this material and, as such, primarily reflects the internal surface formed by pore channels rather than the external surface. Acting in conjunction with the pore space, a large surface favors the formation of gaseous silicon monoxide (SiO) during vitrification, which counteracts the collapse of small pores, because gases entrapped in closed pores are no longer free to escape. As a consequence, a pure opaque quartz glass is obtained that is characterized by its homogeneous pore distribution, high density, sufficiently high viscosity, and low de-vitrification tendency. Quartz glass tubes made from an opaque quartz glass of this type are characterized by their good heat insulation properties and long serviceable life at high temperatures.

The thermal stability can be further increased—especially in thin-walled tubes—by applying a crystallization-inducing substance to the external surface of the preform prior to a subsequent heat reshaping process. To have an external surface with open pores favors the penetration and fixation of the stabilizing substance. It has proven especially suitable to spray-apply a liquid aluminum-containing substance, such as aluminum nitrate or aluminum hexahydrate. In the subsequent heat reshaping process, crystallization nuclei are formed from the substance, and the substance being fixed in the open-pored external surface favors rapid growth of the crystallization zone. The crystallization zone confers a thermal stabilization effect by effectively preventing the so-called "sagging" which occurs early in the use of components at high temperatures, and thus increases the serviceable life. This is especially important with thin-walled components. The specific surface of the SiO$_2$ granulated material is determined pursuant to the BET process (DIN 66132).

In a preferred variant of the process, the mean particle size of the SiO$_2$ primary particles is in the range of 0.5 μm to 5 μm or below 0.2 μm. While the former can be obtained by manufacturing the primary particles by hydrolysis of organic silicon compounds according to the so-called "sol-gel" process, particle sizes below 0.2 μm are present in pyrogenic primary particles produced by flame hydrolysis or oxidation of inorganic silicon compounds. It is also feasible to produce and process mixtures of these primary particles in the process of the invention, and primary particles obtained from precipitated silicic acids can be used as well. The amorphous structure of the primary particles contributes to the low de-vitrification tendency in the vitrification process.

In both variants of the process, it is characteristic for the primary particles to have a large free surface. Agglomeration of a large number of particles of this type through physical or chemical binding forces leads to the production of suitable granulated materials for the purposes of the present invention. Granulation can be effected by common known procedures, especially pelletizing (a wet granulation process), spray-drying or pressure granulation (extrusion) of a suspension or mass containing the primary particles. Especially primary particles produced by the sol-gel process are densely packed in the granulated material, as the majority of these particles are of the preferred spherical shape. The free surface is reduced by the contact surfaces of adjacent primary particles; however, as has been mentioned above, closed pores may also be formed between individual primary particles in the process of vitrification. As primary particles with a small mean particle size below 5 μm are used, an accordingly fine pore distribution is attained. The mean particle size is determined pursuant to ASTM C1070, and called the D$_{50}$ value.

It is advantageous to use a granulated material in which the individual SiO$_2$ grains show an inhomogeneous density distribution with an internal area of lower density being at least partially encased by an external area of higher density. This allows the entrapment of the gases in the internal area and prevents the escape of the gases, fully or partly, during vitrification, which contributes to pore formation and attainment of opacity by the quartz glass. Preferably this internal area is shaped as a hollow space that is at least partially separated from the outside by an external area of higher density.

Alternatively or as an addition, it is preferable to have the external surface of the agglomerates possess fissures. A highly structured, fissured external surface contributes to the trapping of gases and pore formation during the melting process of preform production. Surface properties of the described type can be attained by producing the granulated material by extrusion. Granulated materials, such as build-up granulates (pelletized granules), spray granulates and extrudates, haven proven suitable for the purposes of the present invention.

It has been advantageous to use a granulated material in which the agglomerates are pre-compacted by thermal treatment at a temperature of 800° C. to 1,350° C. This thermal treatment allows the compacted bulk density and specific surface to be adjusted to the desirable values stated above. In the process, the external surface can be made to be more dense than the porous or hollow internal area such that mainly the pores and pore channels of the external area of the material shrink and close during vitrification. For this purpose, the thermal treatment is stopped or suspended before the initial temperature gradient between external and internal area is completely equilibrated and while compaction is still incomplete. This is easy to implement, e.g. by passing the granulate through a heating zone. By conducting the thermal treatment in a chlorine-containing atmosphere, any contaminants forming volatile chlorine compounds and any OH-groups are removed. This improves not only the purity of the granulated material, but also increases the viscosity of the quartz glass made from the granulated material, and further reduces the de-vitrification tendency. The chlorine-containing atmosphere can contain chlorine and/or a chlorine compound.

It has been especially advantageous to use a SiO$_2$ granulated material consisting of agglomerates with a mean particle size between 100 μm and 4,000 μm. It can be advantageous to remove the fine fraction of agglomerates with a grain size below 100 μm. For this purpose, the grains with a size below 100 μm are either removed from the granulated material once formed, or the formation of these grains during production of the granulated material is suppressed. During the melting process of preform production or a thermal treatment for pre-compaction of the granulated material, temperature gradients are easier to establish in a coarser granulate grain. Temperature gradients lead to an ensuing density gradient inside the grain with the external area being denser, and thus favors pore formation during the melting process, as has been explained above. In contrast, because of their small size, fine agglomerate grains inhibit or even prevent the formation of a density gradient of the described type, and, as a consequence, the fine grain fraction fails to contribute to pore formation.

The viscosity of the quartz glass tube made from this material can be increased by doping the granulated material with 5 wt-ppm to 20 wt-ppm aluminum. Doping with finely distributed, nano-scale $Al_2O_3$ particles affords a homogeneous distribution of the doping agent; their large specific surface renders $Al_2O_3$ particles special-manufactured for this purpose by a pyrogenic process especially suitable for this application. The aluminum doping agent can also be introduced by means of an aluminum-containing liquid (solution), e.g. in the form of an aluminum nitrate or aluminum chlorate solution.

It is advantageous to produce the preform from the opaque quartz glass by melting in an arc of light, in the course of which a vitrification front moves from an internal surface of the preform towards the outside. In a hollow cylinder-shaped preform, this internal surface corresponds to the inner wall of the bore hole. The vitrification front is a poorly defined phase boundary between completely and partially melted material. The partially melted material still contains open pores and channels, whereas the completely melted material contains only closed pores with no contact to the external surface. The preform is heated from the inside such that the vitrification front propagates from there through the wall of the preform towards the outside. Contaminants capable of sublimation are thus transferred into the gas phase and driven out ahead of the vitrification front towards the porous area of the preform, from which they escape or can be aspirated off.

In this process it has proven advantageous to use an arc and, progressing from inside towards the outside, heat the preform to a vitrification temperature in excess of 1900° C. while the preform rotates around its rotation axis. Rotation of the preform ensures that the preform is heated uniformly, which is essential to prevent temperature peaks and the formation of density gradients. By heating in an arc, the preform is exposed to particularly high temperatures in excess of 1,900° C. At these temperatures, diffusion and mass transfer processes are accelerated such that contaminants, especially gaseous contaminants, can be effectively removed by sublimation and aspiration.

In a preferred process, a horizontal drawing process is used to reshape the preform to a quartz glass tube. In a horizontal drawing process, the preform, shaped like a hollow cylinder, is oriented horizontally and made to rotate around its longitudinal axis, while it is being slowly and continually moved into a heating zone, where it is blown against a shaping tool and continually drawn out under the influence of an internal overpressure. This process is especially suitable for the manufacture of opaque quartz glass tubes with a wall thickness in the range of 0.5 mm to 15 mm. At least to some extent, the wall thickness also depends on the mechanical and thermal stability required by a given tube diameter under the given conditions of use. For instance, the wall thickness of tubes with a diameter of 250 mm usually is between 5 mm and 8 mm.

In an alternative, but equally preferred, variant of the process, a vertical drawing process is used to reshape the preform to a quartz glass tube. This process also uses a hollow cylinder-shaped preform having its longitudinal axis oriented vertically. The preform is continually moved into a heating zone in which it is softened and, usually without the use of any tools, drawn out into a thin-walled quartz glass tube. The process is preferred for the manufacture of quartz glass tubes with an external diameter of up to 50 mm and a wall thickness of less than 4 mm.

With respect to the tube-shaped opaque quartz glass component, the technical task described above is solved by the quartz glass of the component being made from synthetic $SiO_2$ with a lithium content of no more than 100 wt-ppb, and the wall thickness being in the range of 0.5 mm to 15 mm.

The component manufactured according to the invention is characterized by the following features:

(a) the component consists of synthetic quartz glass, characterized in general by its high purity and in particular by its low lithium content of 100 wt-ppb or less;

(b) the component is thin-walled with the wall thickness being in the range of 0.5 mm to 15 mm; and (c) the component consists of opaque quartz glass.

In quartz glass production, requirements (a) and (b) make the attainment of feature (c) (opacity) difficult. The process according to the invention is the first to facilitate the manufacture of such thin-walled quartz glass tubes from opaque, highly pure quartz glass.

Because of their high purity and opacity, quartz glass tubes manufactured according to the process are very suitable especially for heat engineering applications in semi-conductor production. The very fine pore distribution of components made from this material provides for very good heat insulation in applications according to the invention. Local temperature peaks on one side of the opaque component are evened out by the opacity of the quartz glass such that a more homogeneous temperature profile is established on the other side of the component. Thin-walled quartz glass tubes are used e.g. in applications in which both low weight and high opacity are required. Fabricated from a preform in a first heat reshaping process, quartz glass tubes manufactured according to the invention are obtained after at least one additional heat reshaping process with only the subsequent heat reshaping process or processes facilitating cost-effective production of highly pure quartz glass tubes of high dimensional accuracy from synthetic starting materials. Because of the high dimensional accuracy of these tubes, other quartz glass tubes, especially transparent quartz glass tubes, can be attached by melting to said tubes to a precise fit.

It is another improvement to design the quartz glass to have a low sodium content below 200 wt-ppb, preferably below 60 wt-ppb, and a low potassium content below 200 wt-ppb, preferably below 50 wt-ppb. At the low content of alkali metal contaminants, quartz glass of this type is characterized by its comparatively high viscosity. The lithium contamination level should typically be below 10 wt-ppb.

For application in semi-conductor production and heating processes, it is very preferable to use a part with a wall thickness between 4 mm and 8 mm.

For high temperature applications, it is very preferable to use a quartz glass tube possessing a stabilization layer. A stabilization layer can be produced by applying a crystallization-inducing component to the external surface of the preform prior to a heat reshaping process, as is described above in the explanation of the process according to the invention. During heat reshaping, a stabilization layer in the form of a thermally stabilizing crystallization zone is formed on the external surface of the preform, and prevents the part from sagging in high temperature applications.

What is claimed is:

1. A method for manufacture of a component of opaque, synthetic quartz glass, comprising the following production steps:
   (a) Provision of a starting material in the form of granulated synthetic, highly pure $SiO_2$ comprised of at least partially porous agglomerates of primary $SiO_2$ particles and having a minimum compacted bulk density of no less than 0.8 g/cm$^3$,
   (b) Filling of the granulated material into a mold and melting to make a preform of opaque quartz glass,
   (c) Reshaping of the preform in a thermal reshaping process to form the component of opaque quartz glass.

2. A method according to claim 1, in which following removal of the preform from the mold, the outer surface of the preform is treated mechanically, the preform subsequently being moved to a heating zone in which, beginning at one end, it is progressively softened while being reshaped by extending and blowing up to form the said component.

3. A method according to claim 1, in which $SiO_2$ granulated material of a compacted bulk density ranging from 0.9 g/cm$^3$ to 1.4 g/cm$^3$ is used.

4. A method according to claim 2, in which $SiO_2$ granulated material of a compacted bulk density ranging from 0.9 g/cm$^3$ to 1.4 g/cm$^3$ is used.

5. A method according to claim 1, in which $SiO_2$ granulated material with a specific surface area between 1.0 m$^2$/g and 40 m$^2$/g is used.

6. A method according to claim 5, in which $SiO_2$ granulated material with a specific surface area between 10 to 30 m$^2$/g is used.

7. A method according to claim 1, in which the $SiO_2$ primary particles have a mean particle size ranging from 0.5 $\mu$m to 5 $\mu$m, or a mean particle size of under 0.2 $\mu$m.

8. A method according to claim 1, in which granulated material of inhomogeneous radial density distribution is used in such a way that an inner area of the agglomerate of lower density is at least partially surrounded by an outer area of higher density.

9. A method according to claim 1, in which the granulated material consists of build-up granulates, spray granulates, or an extruded material.

10. A method according to claim 1, in which the outer surface of the agglomerate materials is equipped with indentations.

11. A method according to claim 1, in which granulated material is provided in which the agglomerate materials are pre-densified by thermal treatment at a temperature ranging from 800° C. to 1350° C.

12. A method according to claim 1, in which $SiO_2$ granulates are manufactured from grains of a mean grain size ranging from 100 $\mu$m to 4000 $\mu$m.

13. A method according to claim 1, in which granulated material is manufactured that contains between 5 weight-ppm and 20 weight-ppm of aluminum oxide.

14. A method according to claim 1, in which the preform of opaque quartz glass is melted by means of an arc, a vitrification front proceeding from an inner surface of the preform to the outside.

15. A method according to claim 14, in which the preform under rotation around a rotation axis is heated starting from one end and progressing towards the other by means of the arc starting at the inner surface to a vitrification temperature exceeding 1900° C.

16. A method according to claim 2, in which the preform in a horizontal drawing process is reshaped to form an opaque quartz glass tube.

17. A method according to claim 2, in which the preform in a vertical drawing process is reshaped to form an opaque quartz glass tube.

* * * * *